Feb. 14, 1950     J. L. YOUNG     2,497,384
REMOVABLE UTENSIL HANDLE
Filed July 3, 1946
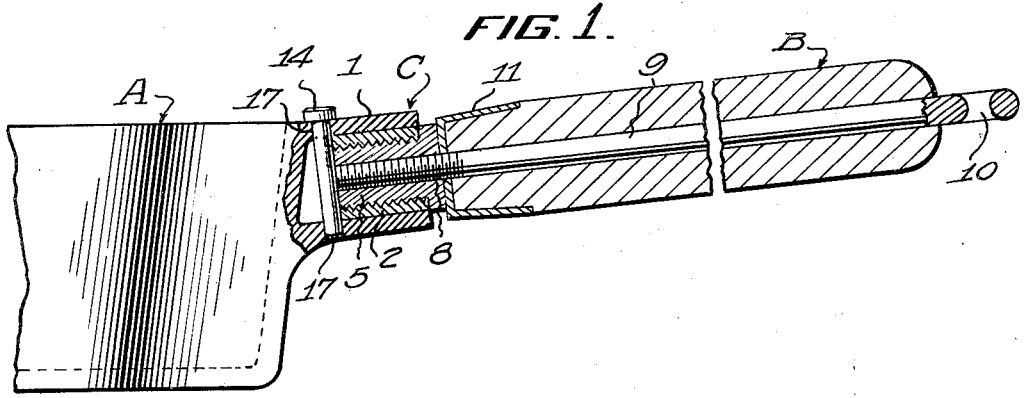
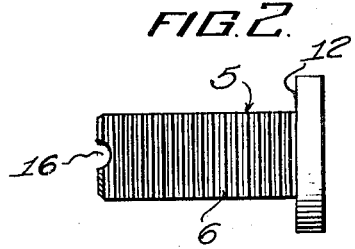
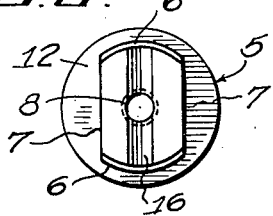 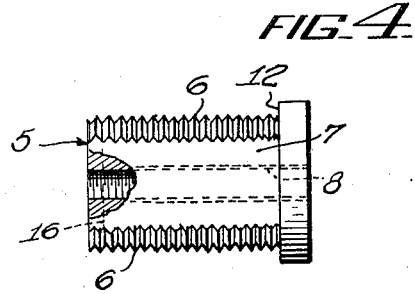
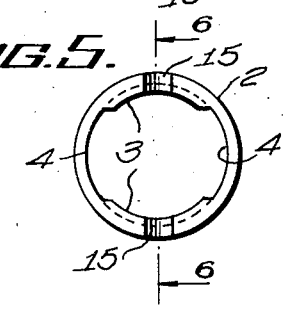 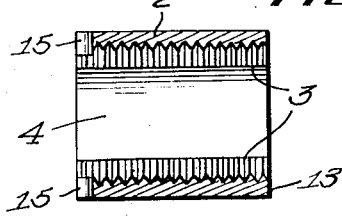
Inventor
JONAS L. YOUNG
By Baldwin & Wight
Attorneys Patented Feb. 14, 1950

2,497,384

UNITED STATES PATENT OFFICE 2,497,384

REMOVABLE UTENSIL HANDLE

Jonas L. Young, Catasauqua, Pa.

Application July 3, 1946, Serial No. 681,399

2 Claims. (Cl. 16—114)

This invention relates to cooking utensils such as skillets, stew pots, boilers, or other vessel type utensils used for cooking or preparing food. The invention relates more particularly to cooking utensils having quickly and easily detachable handles.

Cooking utensils formed or equipped with fixed or solid projecting handles are unnecessarily space-consuming and awkward to store. Moreover, when several such utensils are used on a stove, the projecting handles get in the way of each other. It has been proposed heretofore to overcome these difficulties by providing utensils of this class with detachable handles so that the handles can be removed to facilitate nesting and compact storing of several utensils, and to enable the handles to be removed from vessels once they have been placed on a stove.

An object of the present invention is to provide a utensil of the general character referred to including simple and improved means for detachably but securely connecting the handle to the vessel.

Another object of the invention is to provide a cooking utensil and handle assembly or combination in which the handle may easily and firmly be connected to the vessel, throughout a substantial part of the handle length, by moving the handle endwise and then turning it less than a full turn relatively to the vessel.

Other objects will become apparent from a reading of the following description, the appended claims, and the accompanying drawing, in which:

Figure 1 is a fragmentary view of a skillet embodying the invention with some parts shown in side elevation and some in vertical section;

Figure 2 is a detailed plan view of an exteriorly threaded connecting stem shown in Figure 1 as forming part of or being connected to the handle;

Figure 3 is an end view of the stem shown in Figure 2;

Figure 4 is a view showing the stem as seen when looking downwardly from above Figure 2;

Figure 5 is an end elevational view of a sleeve; and

Figure 6 is a section on the line 6—6 of Figure 5.

The invention is illustrated as being embodied in a cooking utensil or skillet including a vessel A, a handle B, and means collectively and generally designated C for detachably connecting the handle to the vessel. In its general nature, the connecting means C comprises parts on the vessel A and the handle B respectively, adapted to cooperate with each other as interrupted helical screw threaded devices, the arrangement being such that the handle may be firmly and detachably connected to the vessel by first moving the handle endwise toward the vessel and then turning it through less than a full turn. The particular construction of connecting means C illustrated in the drawing, and hereinafter to be described, embodies the invention in its preferred form and although the invention may have specifically different constructional forms of interrupted screw connecting devices, the particular form shown has features by which the connecting means is especially effective in providing convenience in handling and safety and firmness of attachment of the handle to the vessel.

In the form shown, the vessel A is formed with an integral, outwardly projecting hollow boss 1 in which is mounted a sleeve 2, preferably by a secure press fit. The sleeve 2 is formed on its internal wall with interrupted helical threads 3. The interruption of the threads provides diametrically opposed internal wall portions 4—4 which have no threads, as shown clearly in Figures 5 and 6.

Secured to the handle B is an attaching stem 5 adapted to have threaded engagement with the sleeve 2 for attaching the handle B to the vessel A. As shown most clearly in Figures 2, 3, and 4, the stem 5 has helical threads 6 which are interrupted so as to leave flat non-threaded portions 7 disposed between the threaded portions 6 and being opposed diametrically to each other. The stem 5 is internally threaded as at 8 for connection to the threaded inner end of a rod 9 which passes through the handle B and is formed at its outer end with a loop 10. Preferably, a ferrule 11 is fitted to the inner end of the handle. When the rod 10 is turned up tightly, it will hold the stem 5 and the ferrule 11 securely fixed to the handle B.

In order to effect attachment of the handle to the vessel, the handle with the stem 5 thereon is so aligned with the sleeve 2 that the non-threaded parts 7 of the stem 5 register with the threaded parts 3 the sleeve 2. The handle is then moved endwise to insert the stem 5 in the sleeve, after which the handle is given a one-quarter turn to engage the stem threads 6 with the sleeve threads 3. Although only one-quarter turn is necessary to effect engagement of the threads, the threads on the stem 5 and sleeve 2 will engage each other through a substantial length of the handle of stem 5 so that an extended connecting contact is provided, and secure attachment is thus effected. In order to remove the handle, the operation is reversed, that is, the handle is turned reversely one-quarter turn, and is then drawn endwise away from the vessel A.

Preferably, cooperating shoulders 12 and 13 are provided respectively on the stem 5 and sleeve 2. These shoulders are adapted to engage each other just before the quarter turn of the handle B has been completed. Consequently, the threads 6 and 3 will be caused to bind against each other so as to resist accidental reverse turning of the handle.

As a further precaution against accidental detaching of the handle from the vessel, a locking pin 14 may be extended through registering notches 15 in the sleeve 2 and a notch 16 in the handle stem 5. Holes 17—17 are formed in the boss 1 for receiving the locking pin.

In the illustrated embodiment, the threads on each of the connecting parts are interrupted at two diametrically opposed portions. It will be understood, however, that this arrangement may be varied, the essential relation being that the sleeve part 2 be formed on its internal wall with helical threads interrupted along at least one wall portion, and that the stem be formed exteriorly with helical threads which are interrupted on at least one surface portion corresponding to the threaded portion of the sleeve part.

Various other modifications in the construction specifically disclosed may be made without departing from the invention as defined in the claims.

I claim:

1. In a cooking utensil or the like, including a vessel and a removable handle, connecting means for said handle comprising a hollow socket member formed on the external wall of said vessel, a series of helical threads on the inner face of said socket, longitudinally interrupted on at least one side to form a threadless strip, a stem member fixed to said handle and having a series of complementary external helical threads which are longitudinally interrupted on at least one side to form a threadless strip corresponding to the threaded area of said socket, said stem member being insertable longitudinally in said socket member when the threaded areas of each member are aligned with the threadless strip of the respective other member, said stem being thereafter rotatable through a part only of one turn to effect interengagement of said threaded areas, the wall of said socket member being formed with diametrically opposed openings and the inner end of said stem member being provided with a transverse groove adapted to register with said openings, and a removable locking pin extending through said openings and said groove.

2. In a cooking utensil or the like, including a vessel and a removable handle, connecting means for said handle comprising a hollow socket formed on the external wall of said vessel, a sleeve member secured in said socket, a series of helical threads on the inner face of said sleeve member, longitudinally interrupted on at least one side to form a threadless strip, a stem member fixed to said handle and having a series of complementary external helical threads which are longitudinally interruted on at least one side to form a threadless strip corresponding to the threaded area of said sleeve, said stem member being insertable longitudinally in said socket and sleeve member when the threaded areas of each member are aligned with the threadless strip of the respective other member, said stem being thereafter rotatable through a part only of one turn to effect interengagement of said threaded areas, the wall of the socket and the sleeve member being formed with diametrically opposed openings and the inner end of said stem member being provided with a transverse groove adapted to register with said openings, and a removable locking pin extending through the openings in said socket and sleeve member and said groove.

JONAS L. YOUNG.

REFERENCES CITED

The following references are of record in the file of this patent:

UNITED STATES PATENTS

| Number | Name | Date |
|---|---|---|
| 599,986 | Manning et al. | Mar. 1, 1898 |
| 1,494,524 | Adamson | May 20, 1924 |
| 1,629,058 | Wilson | May 17, 1927 |
| 1,809,060 | Nelson et al. | June 9, 1931 |
| 2,047,704 | Podolsky | July 14, 1936 |

FOREIGN PATENTS

| Number | Country | Date |
|---|---|---|
| 18,268 | France | Mar. 9, 1914 |
| (Addition to No. 454,320) | | |
| 510,003 | France | Nov. 25, 1920 |